June 28, 1960
G. M. BRANCH, JR., ET AL
2,943,229
SLOW WAVE STRUCTURES
Filed Jan. 25, 1955
2 Sheets-Sheet 1
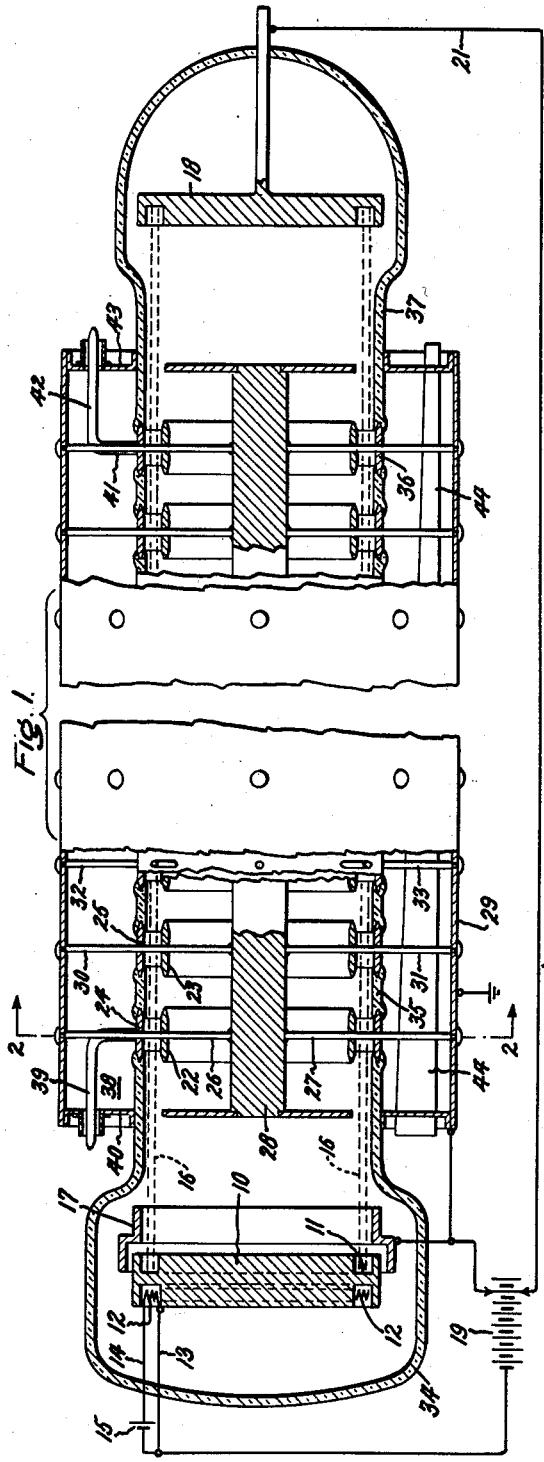
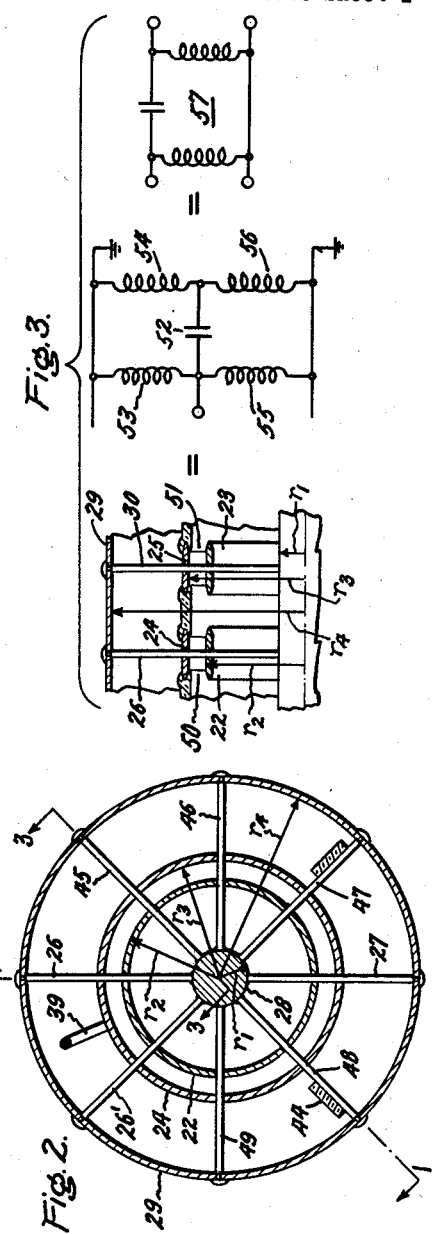
Inventors:
Garland M. Branch, Jr.,
Malcolm R. Boyd,
by Paul A. Frank
Their Attorney June 28, 1960 G. M. BRANCH, JR., ET AL 2,943,229
SLOW WAVE STRUCTURES
Filed Jan. 25, 1955 2 Sheets-Sheet 2
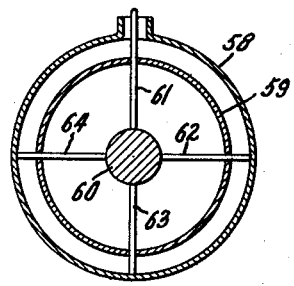
Fig. 4.
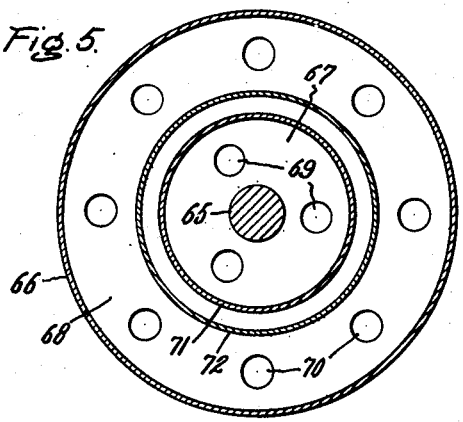
Fig. 5.
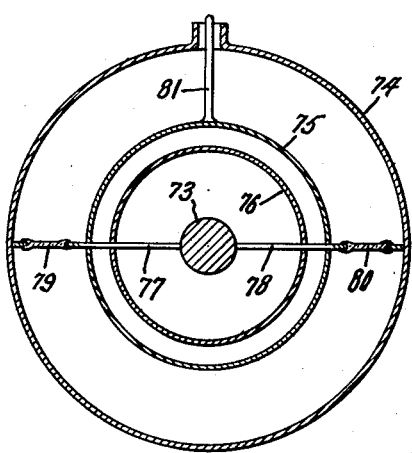
Fig. 6.
Fig. 7.
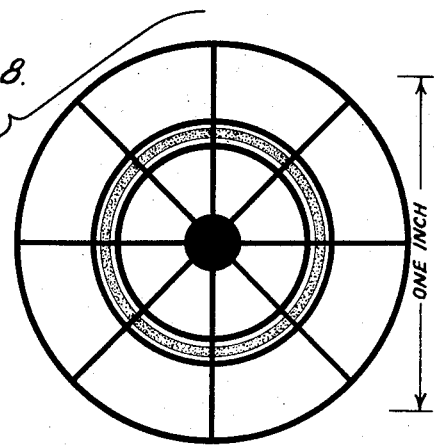
Fig. 8.
Inventors:
Garland M. Branch, Jr.,
Malcolm R. Boyd,
by Paul A. Frank
Their Attorney

United States Patent Office 2,943,229
Patented June 28, 1960

2,943,229

SLOW WAVE STRUCTURES

Garland M. Branch, Jr., and Malcolm R. Boyd, Schenectady, N.Y., assignors to General Electric Company, a corporation of New York Filed Jan. 25, 1955, Ser. No. 483,976

15 Claims. (Cl. 315—3.6)

This invention relates to slow wave structures of the periodic type. While these slow wave structures may be utilized in a wide variety of applications, they are ideally suited for use in traveling wave interaction devices utilizing annular electron beams and are particularly described in that connection.

Traveling wave interaction devices are commonly called traveling wave tubes and operate on the principle of continuous or periodic interaction of an electron beam with the axial components of the electric field associated with an electromagnetic wave transmitted along a suitable slow wave structure. The electrons in the beam must travel in proper synchronism adjacent to the slow wave structure and this structure must be designed so as to provide relatively strong axial electromagnetic wave energy fields over the cross section of the electron beam.

If the electrons in the electron beam are traveling at a velocity slightly greater than the velocity of the axial component of the electromagnetic wave energy, energy is transferred from the electron beam to the electromagnetic wave and there results an amplified electromagnetic wave output from the traveling wave tube.

In order to provide strong coupling between the electromagnetic wave energy and the electron beam, the dimensions of the region in the slow wave structure through which the electron beam passes must be smaller than a wave length along the slow wave structure.

In conventional traveling wave tubes employing solid electron beams along the axis of a surrounding slow wave structure, the beam area is limited by the required small diameter of the tunnel through which the beam passes, particularly at higher operating frequencies.

Therefore, it is an object of this invention to provide improved periodic structures for use in traveling wave interaction devices utilizing relatively low electron beam current density.

It is also an object of this invention to provide an improved slow wave structure.

A further object of this invention is to provide an improved periodic slow wave structure for use with an annular electron beam.

An additional object of this invention is to provide an improved relatively rugged, easily constructed and cooled periodic slow wave structure.

Another object of this invention is to provide a wide band pass substantially non-resonant periodic structure.

It is also an object of this invention to provide an improved periodic structure incorporating a wide band electromagnetic wave energy coupling means.

A further object of this invention is to provide an improved periodic structure including substantially non-saturating stabilization.

According to an important aspect of this invention there is provided a periodic slow wave structure comprising a plurality of interaction members spaced along an annular electron beam. A coupling means is provided for coupling each of the interaction members to a common conductor to provide a periodic structure whereby electromagnetic wave energy applied to the periodic structure is propagated along the structure and interacts with the annular beam of electrons.

Additional features and other important objects of this invention will become more apparent from the following specification and claims when taken in connection with the figures of the drawing wherein Figure 1 illustrates an exemplary embodiment of a periodic slow wave structure in accordance with this invention; Figure 2 illustrates a view of the structure of Figure 1 taken along section 2—2; Figure 3 illustrates a structure substantially equivalent to that shown in Figures 1 and 2 which is used in explaining the operation of this invention; Figures 4 through 7 illustrate modifications of the structure shown in Figures 1 and 2 of the drawing; and Figure 8 is a diagrammatic illustration useful in explaining the advantages of the structure of this invention.

In the practice of this invention an annular beam is caused to pass through an annular tunnel region which is coupled to a slow wave structure in order that the electromagnetic wave energy propagated along the slow wave structure can interact with and absorb energy from the electrons in the electron beam. Thus, the general requirement for good coupling, that the tunnel diameter be smaller than a wave length of the electromagnetic energy along the guide, is met by keeping the annular gap width small. However, the mean diameter of the annulus and hence the cross sectional area of the beam is unrestricted over relatively wide limits so that relatively high power levels can be handled with easily obtainable electron beam densities and voltages.

Thus, in effect, the customary limitations on beam current density are overcome by utilizing an annular beam within a slow wave structure which provides uniformly strong axial electric fields over the cross-section of the beam and the high frequency requirement is met by keeping the annular gap width small.

Figure 1 shows an electron gun including annular electron emitter 10 having an annular emitting surface 11. Heater 12 causes surface 11 to emit an annular beam of electrons and is energized through leads 13 and 14 by power supply 15. The electron beam 16 is accelerated by accelerating anode 17 and is collected by electron collector 18. Power supply 19 supplies an adjustable potential to the accelerating electrode 17. It is noted that the electron beam is focused by a conventional axial focusing field (not shown) in a well known manner. This magnetic focusing field and the means of establishing it have not been illustrated in the drawing in the interests of simplifying the description of this invention. Lead 21 provides direct current potential from power supply 19 to electron collector 18. If desired, the electron collector 18 can be maintained at a lower potential than accelerating electrode 17 in order to decelerate the electrons which have passed through the traveling wave tube and thereby enhance the efficiency of the traveling wave tube.

The periodic structure includes a plurality of interaction members, for example, conducting cylinders 22 and 23 and a second plurality of interaction members, for example, conducting cylinders 24 and 25 which correspond to and are substantially opposed to inner cylinders 22 and 23. There is thereby defined an annular tunnel through which electron beam 16 passes. Coupling means, for example, rods 26 and 27 extend through inner cylinder 22 and outer cylinder 24 to connect the cylinders together, the inner cylinder 22 to inner common conductor 28 and the outer cylinder 24 to common conductor 29 which surrounds and is substantially coaxial to the inner cylinders. In a like manner, rod-like conductors 30 and 31 connect inner cylinder 23 to common conductor 28 and outer cylinder 24 to outer common conductor 29. Similarly, conductors 32 and 33 connect the next set of inner and outer substantially concentric cylinders to the inner and outer common conductors respectively. It is noted that the outer common conductor 29 surrounds the electron beam in order to reduce the tendency for the structure to radiate.

The electron gun is enclosed by a vacuum enclosure 34 and the complete vacuum enclosure consists of the portion surrounding the electron gun and glass connectors between each of the outer cylinders such as glass connector 35. The collector electrode 18 is connected to the terminal portion of the periodic structure consisting of outer cylindrical member 36 by glass enclosure portion 37 to thereby complete the vacuum enclosure. Alternatively outer common conductor 29 can be made part of the vacuum enclosure thereby eliminating the necessity of glass connectors such as connector 35.

Electromagnetic wave energy is introduced to the periodic structure by means of coupler 38 consisting of a conductor 39 which extends over at least a portion of its length at an angle to the radial conductors, then in a direction substantially parallel to the axis of the annular electron beam and then through end plate 40. A separate transmission system is formed between portion 39 and plate 40 so that energy is effectively coupled to the end section only of the periodic structure and the electromagnetic fields along the periodic structure when electromagnetic wave is propagated along the structure are not directly affected by this coupling.

Figure 2 shows the orientation of coupler 38 with respect to radial conductors 26 and 26'. As will be discussed in succeeding paragraphs, the electromagnetic fields tend to be confined to the planes of the radial conductors so that conductor 39 enters in a region of substantially no electromagnetic field and coupling is effected to the terminal interaction element only. In a like manner, power is extracted from the periodic structure after interaction with the electron beam by means of conductor 41 having a portion 42 which extends substantially parallel to the axis of the beam and through end plate 43. Thus, the output coupling forms an effective transmission line between a portion of conductor 41 and plate 43 which effectively prevents direct coupling between the output conductor and the aforementioned electromagnetic fields associated with the electromagnetic wave traveling along the periodic structure.

In order to introduce the necessary stabilization for the operation of this device a volume stabilizer 44, in the form of a tapered card of dielectric material such as ceramic or glass, extends along the slow wave structure and is coupled to at least some of the radial connectors so as to provide shunt attenuation of the periodic structure. The tapered card of dielectric material is coated with a lossy substance so as to introduce the necessary attenuation and the distribution of a lossy material and/or the width of the card can be varied as herein illustrated to obtain the desired attenuating characteristics throughout the length of the periodic structure. One or more of these cards may be introduced for optimum operation and the cards are effectively decoupled from the electron beam so that the tendency toward resistance wall loading effects and saturation of the attenuator are minimized. The attenuation can be easily varied for optimum performance, easily reproduced, is located in a large volume and can therefore be easily cooled.

This form of attenuation loads the inductive portion of the periodic structure so that the propagation characteristics of the structure are only slightly affected. It will be noted from Figure 2 that the resistance cards are supported by the end plates 40 and 43 and that there are shown a plurality of radial connecting rods 45, 46, 47, 48 and 49. Only two rods are necessary; however, it is generally desirable in order to obtain the proper impedance match to use more than two rods.

A logical extension of the structure illustrated in Figures 1 and 2 is to rotate the radial rods through 360° so as to provide two disks for coupling the interaction members to the common conductors. The resulting structure amounts to a disk iris loaded coaxial line with the disks on the inner common conductor 28 opposing the irises on the outer common conductor 29 and providing an annular gap therebetween for the passage of the annular electron beam. Because in general the shorted radial wave guides constituted by the disks and irises do not provide the proper inductance for broad band propagation characteristics they are herein replaced by a plurality of rod-like conductors.

In the slow wave structure as thus far described there are two fundamental modes of transmission. A low pass mode corresponding to transverse electric fields in the annular gap and a high pass mode corresponding to axial electric fields in the gap. This latter mentioned mode is the one which is traveling in the proper direction for proper interaction with the electrons of the annular electron beam. The transverse mode is not desired and if optimum efficiency and stable operation are desired, it is generally effectively eliminated by strapping between the two cylinders forming the annular gap such as, for example, by extending the spokes through the annular gap as illustrated in Figures 1 and 2. In order to reduce the adjacent ring-to-ring capacitance the thickness of the conducting cylinders is slightly tapered at the ends.

As a specific example of a periodic slow wave structure in accordance with this invention and utilized in connection with a traveling wave interaction device, it will be assumed that it is desired to operate at a center frequency of 3000 megacycles. For this center frequency it can be shown that if the radius $r_1$ of the common conductor 28 is approximately ¼ inch, the outer diameter $r_2$ of the inner cylinder 22 should be approximately 1 inch, the inner radius $r_3$ of the outer cylinder 23 should be approximately 1⅛ inches and the inner radius $r_4$ of the outer common conductor 29, should be approximately 1⅞". The accelerating potential applied to accelerating electrode 17 from power supply 19 is in the order of 3,000 volts.

With these operating potentials applied to a tube having substantially these dimensions, electromagnetic wave energy having a center frequency of 3,000 megacycles can be amplified over a bandwidth in the order of 30 to 40%, at output power levels in the order of 500 watts at an overall tube efficiency in the order of 20%. The electromagnetic wave energy is applied to coupler 36, is propagated along the structure and interacts with the electron beam. The amplified wave is extracted from output conductor 41—42.

Figure 3 illustrates a portion of the basic periodic structure utilizing radial conductors and for the purposes of this discussion it will be assumed that there are two radial conductors only, oriented at 180 degrees with respect to each other, rather than the eight radial conductors shown in the illustrations of Figures 1 and 2.

The annular slow wave structure may be considered to consist of a series of elements spaced periodically at a unit distance $d$ along a coaxial transmission line having an inner cylindrical conductor of radius $r_1$ and a hollow outer conductor of radius $r_4$. Each element in the periodic structure is spaced along this coaxial line and consists of a shorted pair of coaxial tubes of radius $r_2$ and $r_3$, where $r_1 < r_2 < r_3 < r_4$. These short concentric cylinders or interaction members constitute effective drift tubes and provide a portion of the tunnel through which the annular beam passes. As has been previously mentioned the inner ring is supported by a disk or spokes extending to the central or inner common conductor and the outer ring is supported on an iris or on radial spokes extending to the outer conducting wall or common conductor. The structure can be considered equivalent to a filter network section wherein the capacitance between tunnels 50 and 51 is equivalent to the capacitance 52 and the parallel radial rods 26 and 30 are equivalent to the inductances 53, 54, 55 and 56 and this, in turn, is the substantial equivalent of $\pi$ filter section 57.

In the equivalent circuit 57 shown in Figure 3 the series impedance $Z_1$ of the effective filter section is that of the capacitance C between adjacent pairs of concentric drift tubes and for a relatively thin wall drift tube is given approximately by $$Z_1 = \frac{1}{j\omega C} = g[j\omega \pi \epsilon (r_3^2 - r_2^2)]^{-1} \qquad (1)$$

where $g$ is the spacing between adjacent ends of the drift tubes. The shunt impedance $Z_2$ is that of the inductance of the two shorted radial lines in parallel which for $n$ spokes is approximately given by:

$$Z_2 = j\omega Z_0 (\cot kl_a + \cot kl_b)^{-1} \qquad (2)$$

where $l_a$ and $l_b$ are the electrical lengths of the inner and outer shorted lines adjusted for the end effects and $Z_0$ is the characteristic impedance of $n$ parallel wire lines of separation $d$ and wire diameter $\delta$; therefore $$Z_0 \approx \frac{120}{n} \cosh^{-1} d/\delta \qquad (3)$$

The propagation characteristics from network theory are then given by:

$$\cos \beta d = 1 + Z_1/(2Z_2) = 1 - \frac{\cot kl_a + \cot kl_b}{2Z_0 \omega C} \qquad (4)$$

where C is given implicitly in Equation 1.

Therefore it is apparent that the periodic structure herein disclosed can be shown to be the full equivalent of a $\pi$ filter section. In addition, the considerations of optimum coupling between the electromagnetic wave energy traveling along the periodic slow wave structure must be considered. It can be readily shown that for optimum coupling the following relation must exist:

$$\left(\frac{\omega}{v}\right)(r_3 - r_2) = a \qquad (5)$$

where $\omega$ is proportional to the operating frequency, $v$ is the average electron velocity and $a$ is a number of the order of one (1).

In order to obtain the desired propagation characteristics, this relationship must be related to the inductive and capacitive components of the transmission line which are formed by the radial spokes and the beam tunnels. That is, the spacing between the two concentric cylinders forming a tunnel affects the resulting capacitance of the overall network and the lengths of the radial rods between the common conductors and the coaxial cylinders affects the inductance.

The shorted quarter wave lines may be either solid disks, solid disks with holes in them thereby forming radial wave guides of inherently low characteristic impedance or may consist of one or more radial spokes constituting parallel wire lines of relatively high characteristic impedance. A wide range of impedance between that of solid disk radial lines to that of single parallel wire lines may be obtained by choosing the proper number of spokes to provide parallel wire transmission lines in parallel with one another. The inductance of the solid disk radial wave guide may be increased by drilling a pattern of holes in the disks in order to obtain the optimum shunt inductance to provide maximum bandwidth for a given series capacitance as determined by the radius and spacing of the interaction elements and resulting drift tubes.

Figure 4 illustrates a modification of the structure illustrated in Figure 1 wherein the electron beam passes between a series of cylinders such as cylinders 58 and 59. The cylinders can be coupled to an inner common conductor 60 by radial lines 61, 62, 63 and 64. The outer cylindrical conductor 58 can be continuous and the inner cylindrical conductor 59 broken up into a series of short lengths of tubing spaced along an electron beam path so as to provide a periodic structure having the necessary capacitance between the short lengths of tubing. The radial conductors extend through the annular beam path in order to minimize radial electric fields associated with the transverse mode of electromagnetic wave propagation along the structure. One of the spokes extends through the outer wall to provide the center conductor of a coaxial coupler for electromagnetic wave energy coupling between the periodic structure and an external system.

Figure 5 illustrates one section of a periodic structure consisting of inner common conductor 65 and outer common conductor 66 with inner disk 67 and outer iris 68. A number of holes 69 and 70 are drilled in the disks to provide the proper impedance loading of the overall periodic structure. Thus there is provided substantially planar coupling means for coupling the inner and outer interaction elements 71 and 82 to respective inner and outer common conductors 65 and 66.

In order to obtain satisfactory coupling and broad band operation it is particularly desirable to be able to couple into the first section only of the periodic structure and to couple out of the last section only of the periodic structure without the coupling directly affecting the electromagnetic fields associated with the other sections of the periodic structure. Thus there is shown in Figure 1 coupler 38 extending substantially perpendicular to the annular electron beam and substantially isolated from the electromagnetic fields associated with the radial spokes so as to effect coupling to the terminal interaction element of the periodic structure with substantially little or no coupling to the electromagnetic fields associated with the other sections of the periodic structure when an electromagnetic wave is propagated along the structure. This results in a very effective broad band coupling.

Figure 6 further exemplifies this method of coupling wherein there is shown a single section of a periodic structure consisting of inner common conductor 73, outer common conductor 74 with outer and inner concentric interaction elements 75 and 76 respectively coupled thereto by means of a pair of radial rods 77 and 78 respectively.

In order to stabilize the operation of the interaction device, one or more of the conducting radial rods 74 and 75 may be replaced in whole by a rod or rods of relatively high resistance or in part by segments 79 and 80 of high resistance material. The rod or segment of high resistance material may either be a non-conductor such as a glass or ceramic rod sprayed with a lossy resistive coating or it may be a solid conductor of high resistance material.

Coupling to this section is effected through rod 81 which extends through outer common conductor 74 to form the center conductor of the coaxial transmission line. It is readily apparent that this center conductor could also form an exciting probe for a wave guide coupler.

It will be noted that in the structure illustrated in Figure 6, the electromagnetic fields, associated with an electromagnetic wave traveling along the structure, are substantially confined to the plane defined by the radial rods 77 and 78 and therefore there is substantially no electric field in the region of coupling rod 81 which makes electrical connection with outer interaction element 75.

Thus, there is provided a means of access to the terminal elements only or to any desired element of the interaction device without directly affecting the fields of the other sections of the periodic structure. A more complete disclosure of this method of coupling to a periodic structure is contained in a copending application Serial No. 483,975, now U.S. Patent 2,843,797, by M. R. Boyd filed concurrently herewith and assigned to the same assignee as this invention.

Where broad band coupling is not particularly necessary, or desired, coupling can be effected by extending one of the radical spokes through the outer common conductor such as illustrated in Figure 4. If desired, electromagnetic wave energy can be introduced into the periodic structure, as shown in Figure 7, by means of a simple loop such as loop 82 which makes contact with outer common conductor 29 after having passed through end plate 40 from coaxial line 83. These two methods of coupling result in a relatively narrow pass band since this form of coupling results in some direct coupling to other than the terminal sections of the periodic structure and therefore a satisfactory impedance match over a relatively narrow band only.

In addition, it is generally necessary to add some form of stabilization to an interaction device of this type in order to prevent backward wave oscillation due to reflected electromagnetic wave energy. This form of stabilization is generally in the form of a member of high loss material which is so introduced as to attenuate both the forward and backward traveling waves but having sufficient attenuating capacities so that it will not saturate and therefore will attenuate all of the backward traveling wave energy. It can be shown that the propagation characteristics will be relatively little affected if the attenuator is introduced so as to shunt sections of the periodic structure. Therefore, the attenuators herein shown as a portion of this invention are illustrated as being of the shunt loading type.

In the showing of Figure 1 there are only two attenuator cards; however, it will be readily appreciated that these cards may take a large number of forms and that one or more may be utilized in order to obtain optimum tube operation. For example, some of the cards may be coated over a short portion only in order to achieve optimum coupling with others having longer attenuating coatings, thereby effecting optimum attenuation for both low and high frequencies in the frequency pass band.

Alternatively, inductive loading can be achieved in a manner as illustrated in Figure 6 of the drawing. It will be noted that this coating is remote from the electron stream so that there is little likelihood of its being saturated as a result of interaction with the electrons in the electron stream. This form of attenuation has the same attendant advantages as that shown in Figure 1 in that it is in a large volume and can therefore be easily reproduced, adjusted and cooled.

A more complete description of attenuators of this type appears in the aforesaid M. R. Boyd application, Serial No. 483,975, now U.S. Patent 2,843,797.

Therefore, it is apparent that the advantages of an annular beam periodic slow wave structure in accordance with this invention include, ease of construction, great heat dissipating ability, large bandwidth, and relatively low current density for a given power level. These advantages are illustrated more clearly in Figure 8 of the drawing wherein a comparison is made between a conventional helix traveling wave tube 84 and an annular beam periodic structure 85 each designed for service as a relay amplifier in communication networks at a center frequency of approximately 7700 megacycles. These tubes are designed for a beam voltage of 1000 volts and for a direct current input power of approximately 30 watts. The annular beam periodic structure of this invention is seen to be a more rugged structure than the relatively non-rigid helix and obviously has better heat dissipating characteristics.

The current density designated by the letter J designates beam current densities in amperes per square centimeter. The indicated required current density in the helix tube of approximately 3 amperes per square centimeter is seen to be prohibitively large at this high operating frequency whereas the annular periodic structure of this invention requires a beam of a relatively low and easily attainable current density of approximately 1/10 of an ampere per square centimeter.

In view of the foregoing it is readily apparent that the examples herein disclosed and described are considered to be merely exemplary of this invention. For example, structures having a square or polygonal cross-section and utilizing a hollow or annular beam may be constructed in the practice of this invention. Therefore, it is intended in the appended claims to cover all modifications and variations coming within the true spirit and scope of this invention.

What we claim as new and desire to secure by Letters Patent of the United States is:

1. A slow wave structure for interaction with an elongated electron beam over an extended length thereof comprising a first plurality of interaction members spaced along a beam path on one side thereof, a second plurality of interaction members spaced along the beam path on the opposite side thereof and each generally aligned with one of said first plurality of interaction members to provide pairs of members with extended surfaces in opposed relation and with successive pairs of said members separated by interaction gaps, an elongated conductor extending generally parallel to the direction of the beam path and spaced from said interaction members, and coupling means of substantially less dimension in the direction of the beam than said interaction members extending substantially normal to the direction of the beam path between said first plurality of interaction members and said elongated conducting member.

2. The slow wave structure as defined in claim 1 wherein the adjacent ends of the interaction members are of decreasing thickness toward the ends of the interaction members.

3. A slow wave structure for interaction with an elongated electron beam over an extended length thereof comprising a first plurality of interaction members spaced along a beam path on one side thereof, a second plurality of interaction members spaced along the beam path on the opposite side thereof and each generally aligned with one of said first plurality of interaction members to provide pairs of members with extended surfaces in opposed relation and with successive pairs of said members separated by interaction gaps, an elongated conductor extending generally parallel to the direction of the beam path and spaced from said interaction members, coupling means of substantially less dimension in the direction of the beam than said interaction members extending substantially normal to the direction of the beam path between said first plurality of interaction members and said elongated conducting member, and conducting means extending directly between the aligned pair of said interaction members.

4. A slow wave structure for interaction with an elongated electron beam over an extended length thereof comprising a first plurality of interaction members spaced along a beam path on one side thereof, a second plurality of interaction members spaced along the beam path on the opposite side thereof and each generally aligned with one of said first plurality of interaction members to provide pairs of members with extended surfaces in opposed relation and with successive pairs of said members separated by interaction gaps, a pair of elongated conductors each extending generally parallel to the direction of the beam path and spaced from said interaction members on opposite sides thereof and coupling means of substantially less dimension in the direction of the beam than said interaction members extending substantially normal to the direction of the beam path between said first plurality of interaction members and one of said elongated conducting members.

5. A slow wave structure for interaction with an elongated electron beam over an extended length thereof comprising a first plurality of interaction members spaced along a beam path on one side thereof, a second plurality of interaction members spaced along the beam path on the opposite side thereof and each generally aligned with one of said first plurality of interaction members to provide pairs of members with extended surfaces in opposed relation and with successive pairs of said members separated by interaction gaps, a pair of elongated conductors each extending generally parallel to the direction of the beam path and spaced from said interaction members on opposite sides thereof, coupling means of substantially less dimension in the direction of the beam than said interaction members extending substantially normal to the direction of the beam path between said first plurality of interaction members and one of said elongated conducting members and between said second plurality of interaction members and the other of said elongated conductors.

6. A slow wave structure for interaction with an annular beam of electrons over an extended length thereof comprising a plurality of annular interaction members spaced along the beam, a plurality of annular interaction members of larger diameter spaced along the beam path in opposed relation to said first-mentioned interaction members to provide a succession of interaction gaps, a cylindrical conductor coaxial with respect to said interaction members and coupling means of substantially less dimensions in the direction of the beam than said interaction members extending radially from said interaction members to said conducting member.

7. The slow wave structure as defined in claim 6 wherein the adjacent ends of the interaction members are of decreasing thickness toward the ends of the interaction members.

8. The slow wave structure as defined in claim 6 wherein the coupling means are conducting rods.

9. A slow wave structure for interaction with an annular beam of electrons over an extended length thereof comprising a plurality of annular interaction members spaced along the beam, a plurality of annular interaction members of larger diameter spaced along the beam path in opposed relation to said first-mentioned interaction members to provide a succession of interaction gaps, a cylindrical conductor coaxial with respect to said interaction members, coupling means of substantially less dimensions in the direction of the beam than said interaction members extending radially from said interaction members to said conducting member and a conductor extending between the interaction members on opposite sides of the beam path.

10. A slow wave structure for interaction with an annular beam of electrons over an extended length thereof comprising a plurality of pairs of hollow cylindrical interaction members of different diameters spaced along a beam path on opposite sides thereof with extended surfaces of each pair of members in opposed relation to provide a succession of interaction gaps, an elongated conductor extending within said interaction members and coaxial therewith, a hollow cylindrical conducting member surrounding said interaction members and at least one coupling member connecting each one of said pairs of interaction members with one of said elongated conducting members and extending through the space between said interaction members.

11. The slow wave structure as defined in claim 10 wherein the coupling members are conducting rods.

12. A slow wave structure for interaction with an annular beam of electrons over an extended length thereof comprising a plurality of pairs of hollow cylindrical interaction members of different diameters spaced along a beam path on opposite sides thereof with extended surfaces of each pair of members in opposed relation to provide a succession of interaction gaps, an elongated conductor extending within said interaction members and coaxial therewith, an elongated hollow cylindrical conducting member surrounding said interaction members and at least one coupling member having a small dimension in the direction of the beam as compared with said interaction members and connecting each one of said pairs of interaction members with one of said elongated conducting members.

13. The slow wave structure as defined in claim 12 wherein the coupling members are conducting rods.

14. A slow wave structure for interaction with an annular beam of electrons over an extended length thereof comprising a plurality of pairs of hollow cylindrical interaction members of different diameters spaced along a beam path on opposite sides thereof with extended surfaces of each pair of members in opposed relation, an elongated conductor extending within said interaction members and coaxial therewith, an elongated hollow cylindrical conducting member surrounding said interaction members, at least one coupling member having a small dimension in the direction of the beam as compared with said interaction members and connecting each one of said pairs of interaction members with one of said elongated conducting members, and an elongated attenuator positioned between the interaction members of larger diameter and said elongated hollow conductor and closely adjacent said coupling members.

15. The slow wave structure as defined in claim 14 wherein the cross section of the attenuator decreases gradually with length of the attenuator.

References Cited in the file of this patent

UNITED STATES PATENTS

| | | |
|---|---|---|
| 2,367,295 | Llewellyn | Jan. 16, 1945 |
| 2,407,274 | Hartley et al. | Sept. 10, 1946 |
| 2,636,948 | Pierce | Apr. 28, 1953 |
| 2,641,730 | Touraton et al. | June 9, 1953 |
| 2,643,353 | Dewey | June 23, 1953 |
| 2,679,019 | Lindenblad | May 18, 1954 |
| 2,683,238 | Millman | July 6, 1954 |
| 2,707,759 | Pierce | May 3, 1955 |
| 2,720,609 | Bruck et al. | Oct. 11, 1955 |
| 2,785,335 | Dicke | Mar. 12, 1957 |
| 2,802,135 | Dodds | Aug. 6, 1957 |
| 2,806,172 | Cuccia | Sept. 10, 1957 |
| 2,812,467 | Kompfner | Nov. 5, 1957 |
| 2,819,449 | Herold | Jan. 7, 1958 |